United States Patent
Holt Nørby et al.

(10) Patent No.: US 10,907,254 B2
(45) Date of Patent: Feb. 2, 2021

(54) DEPOSITION OF A COATING ON AN INTERCONNECT FOR SOLID OXIDE CELL STACKS

(71) Applicant: Haldor Topsøe A/S, Kgs. Lyngby (DK)

(72) Inventors: Tobias Holt Nørby, Glostrup (DK); Bengt Peter Gustav Blennow, Humlebæk (DK); Rainer Küngas, Copenhagen (DK); Jeppe Rass-Hansen, Copenhagen (DK); Thomas Heiredal-Clausen, Copenhagen (DK)

(73) Assignee: Haldor Topsoe A/S, Lyngby (DK)

( * ) Notice: Subject to any disclaimer, the term of this patent is extended or adjusted under 35 U.S.C. 154(b) by 34 days.

(21) Appl. No.: 16/466,924

(22) PCT Filed: Nov. 22, 2017

(86) PCT No.: PCT/EP2017/080068
§ 371 (c)(1),
(2) Date: Jun. 5, 2019

(87) PCT Pub. No.: WO2018/108471
PCT Pub. Date: Jun. 21, 2018

(65) Prior Publication Data
US 2019/0345613 A1    Nov. 14, 2019

(30) Foreign Application Priority Data
Dec. 16, 2016    (DK) ................... 2016 00771

(51) Int. Cl.
C23C 28/02 (2006.01)
C23C 18/54 (2006.01)
C25D 5/12 (2006.01)
H01M 8/0208 (2016.01)
H01M 8/0228 (2016.01)

(52) U.S. Cl.
CPC ............... C23C 18/54 (2013.01); C25D 5/12 (2013.01); *H01M 8/0208* (2013.01); *H01M 8/0228* (2013.01)

(58) Field of Classification Search
CPC .............................. C23C 28/02; C23C 28/023
USPC ....................................................... 205/191
See application file for complete search history.

(56) References Cited

U.S. PATENT DOCUMENTS

| | | |
|---|---|---|
| 2005/0282399 A1 | 12/2005 | Evans et al. |
| 2012/0255864 A1 | 10/2012 | Nagai et al. |
| 2012/0309190 A1 | 12/2012 | Kelly et al. |

(Continued)

FOREIGN PATENT DOCUMENTS

| | | |
|---|---|---|
| DE | 10 2008 032 498 A1 | 1/2010 |
| EP | 2 491 608 B1 | 4/2014 |

(Continued)

*Primary Examiner* — Edna Wong
(74) *Attorney, Agent, or Firm* — Blank Rome LLP

(57) ABSTRACT

A method for coating an interconnect for a solid oxide cell (SOC) stack comprises providing an interconnect substrate comprising Cr and Fe, coating the interconnect substrate with a first metallic layer by electrodeposition, coating the resulting structure with a second layer of metallic cobalt by electrodeposition and coating the resulting structure with a layer of metallic copper by ion-exchange plating. This way, a metallic copper-cobalt coating is formed on the interconnect.

10 Claims, 5 Drawing Sheets

(56) References Cited

U.S. PATENT DOCUMENTS

2013/0004881 A1  1/2013  Shaigan et al.
2013/0075270 A1  3/2013  Lee et al.

FOREIGN PATENT DOCUMENTS

| JP | 2014034705 A | * | 2/2014 | ............. C22C 19/07 |
| KR | 10-2010-0072763 A | | 7/2010 | |
| WO | WO 2011/048307 A1 | | 4/2011 | |

* cited by examiner

SEM/EDX analyses of electrodeposited cobalt layer

```
Spectrum: Point

Element AN   Series   C norm.  C Atom.  C Error
                      [wt.%]   [at.%]   [%]
-----------------------------------------------
Cobalt   27  K-series 100.00   100.00   3.4
-----------------------------------------------

Total:   100.00   100.00
```

DEPOSITION OF A COATING ON AN INTERCONNECT FOR SOLID OXIDE CELL STACKS

BACKGROUND OF THE INVENTION

1. Field of the Invention

The present invention relates to a novel coating for interconnects for solid oxide cell (SOC) stacks. Specifically, the invention concerns a method for providing a coating comprising copper and cobalt for the oxygen-side of the interconnect, and more specifically the invention concerns a method for coating an interconnect for a solid oxide cell (SOC) stack by providing an interconnect substrate comprising Cr and Fe, coating the interconnect substrate with a first metallic layer by electrodeposition, coating the resulting structure with a second layer of metallic cobalt by electrodeposition and coating the resulting structure with a layer of metallic copper by ion-exchange plating, thereby forming a metallic copper-cobalt coating on the interconnect.

2. Description of the Related Art

Solid oxide cells (SOCs) generally include cells designed for different applications, such as solid oxide fuel cells (SOFCs) and solid oxide electrolysis cells (SOECs). These types of cells are well-known in the art and described in i.a. WO 2012/062341 and EP 2 194 597 A1, both belonging to the Applicant together with the technical University of Denmark. Both in SOFC and in SOEC technology, a number of identical individual cells, separated by metallic interconnects, are stacked together with additional layers, such as current collectors, contact layers and seals, to form a cell stack suitable for the intended application.

A solid oxide fuel cell comprises an oxygen-ion conducting electrolyte, an oxygen electrode (cathode) at which oxygen is reduced and a fuel electrode (anode) at which fuel (e.g. hydrogen, methane, or natural gas) is oxidized. The overall reaction in an SOFC is that the used fuel and oxygen react electrochemically to produce electricity, heat and an oxidized species. The oxidized species is water if hydrogen is used as fuel, carbon dioxide if carbon monoxide is used as fuel, and a mixture of water and carbon dioxide for hydrocarbon fuels.

A solid oxide electrolysis cell comprises an oxygen-ion conducting electrolyte, a fuel electrode (cathode) at which an oxidized species (e.g. water or carbon dioxide or both) is reduced with the aid of an externally applied electric field, and an oxygen electrode (anode) at which oxygen ions are oxidized to molecular oxygen. The overall reaction in an SOEC is that the oxidized species is converted electrochemically into a reduced species using electricity and heat. If the oxidized species fed into the stack is water, hydrogen is formed on the fuel electrode, and if the oxidized species is carbon dioxide, carbon monoxide is formed on the fuel electrode. If the oxidized species is a mixture of water and carbon dioxide, a mixture of carbon monoxide and hydrogen (also known as synthesis gas) is produced.

An SOEC operates at temperatures suitable for high-temperature electrolysis, i.e. temperatures similar to those of an SOFC (from about 500 to about 1100° C.). High operating temperatures are needed to ensure sufficiently high oxygen ion conductivity in the electrolyte. Commonly used electrolyte materials for SOCs include yttria-stabilized zirconia (YSZ), scandia-stabilized zirconia (ScSZ), gadolinia-doped ceria (CGO), samaria-doped ceria (CSO), strontium- and magnesium-doped lanthanum gallates (LSGM), and many others.

In an SOC stack, a plurality of cells, each including a fuel electrode, an electrolyte, an oxygen electrode, and optionally contact layers, are connected in series by interposing interconnection plates (or interconnects) between each of the cells. The role of the interconnects is to provide electrical contact from one cell to the next, and to aid in the distribution of gases across the cell. In order to reduce electrical resistance arising from contact resistance between the cells and the interconnects, it is of great importance that the contacting between the cells and the interconnects is of good quality, i.e. possessing low electrical resistance and excellent mechanical stability regardless of the operating conditions.

Suitable materials for metallic interconnects need to be oxidation resistant against gases fed to both oxygen and fuel electrode under elevated operation temperatures, and they must further exhibit a thermal expansion coefficient (TEC) that matches the TEC of the ceramic components of the cell. In view of these requirements, particularly ferritic alloys forming chromium oxide surface layers (e.g. chromia-forming ferritic steels) are used as materials for the interconnect. Such alloys comprise a high chromium content (around 15-26 wt. %) which forms a protective chromium oxide barrier layer on the surface, protecting the interconnect against further oxidation. Examples of such high-chromium ferritic steels include, but are not limited to AISI 441, AISI 444, AISI 430, AISI 446, Crofer 22H, Crofer 22APU, ZMG G10, E-brite, Plansee ITM, etc.

During operation of the SOC stack, chromium species may diffuse from the chromium-containing metal interconnect materials into the adjacent oxygen electrode layers and thereby disadvantageously affect the catalyst performance and thus limit the cell performance over time. This phenomenon is generally known as "chromium poisoning". The chromium poisoning is due to the chromium in the metal interconnect being transported from the metal via gaseous chromium-containing oxides and oxy-hydroxides and by surface diffusion on the bridging metal oxide components to the electrochemically active sites near to or on the oxygen side of the electrode, where they quickly deteriorate the electrochemical activity to a considerable degree (J. Electrochem. Soc., 154(4), 2007, pages A295-A306).

A general problem leading to degradation of SOC stacks is related to the oxidation of interconnects in the cathode and anode gases at operating temperature. Thus, a significant characteristic or property that an interconnect must demonstrate is a high resistance to such oxidation.

It is, therefore, desirable to find coatings for SOC interconnects, said coatings being capable of reducing the growth rate of chromium oxide, reducing the extent of chromium volatilization and offering an improved protection against oxidation of the interconnect during stack operation.

Coatings for SOC stack interconnects can be deposited with various methods. Most commonly these coatings are either deposited as a metal or a ceramic. Ceramic coating are most commonly based on Mn—Co spinel compositions whereas metallic coatings are most commonly based on cobalt. The main difference between metallic and ceramic coatings besides the deposition processes is that metallic coatings offer far better adhesion towards the ferritic steel interconnect. Adherence of ceramic coatings is based on van der Waals forces whereas metallic coating offers metallic bonds which in many cases supersedes the bulk strength of the ferritic steel material. The adhesion strength of ceramic coatings is furthermore dependent on a preoxidation step carried out in air in order to form a chromium oxide layer prior to deposition. The reason for this preoxidation step is to add roughness to the interconnect material to obtain somewhat better adhesion of the as-deposited ceramic coating due to mechanical interlocking. The ceramic deposition process is furthermore not able to produce dense coatings, and the adhesion towards the interconnect material is known to be problematic. For this reason, these coatings have the risk to spall upon heating and will therefore have inferior properties regarding protection against chromium poisoning and high temperature oxidation compared to metallic coatings.

Metallic coatings have the advantage that high adhesion strength towards the interconnect material can be obtained. Another advantage of metallic coatings is that the metallic coating process is very easy to upscale. Furthermore, the metallic coating processes are already implemented on a very large scale (electroplating), and they are continuously developed by e.g. the automotive industry. Therefore, electrodeposition of metallic coatings for interconnects use a far more developed process route which also is advantageous from the perspective of production cost.

The purpose of the present invention is to provide an improved method for preparing a metallic coating on a SOC interconnect. State-of-the-art methods for applying coatings on SOC stack interconnects are very expensive and involve the use of complicated techniques such as plasma spraying, physical vapour deposition, etc.

Specifically, the invention concerns a method for providing a coating comprising copper and cobalt for the oxygen-side of the interconnect. It has now surprisingly been found that an interconnect coating made according to the method of the present invention, i.e. where an interconnect substrate comprising Co and Fe is coated with a first metallic layer by electrodeposition, where the resulting structure is coated with a second metallic layer of cobalt by electrodeposition and where the resulting structure is further coated with a layer of metallic copper by ion-exchange plating, results in an effective barrier for volatilization and diffusion of chromium species, hereby reducing the issue with poisoning of oxygen electrode materials. Compared to the prior art, the method of the present invention is relatively inexpensive. Furthermore, the method is easily up-scalable.

Electrodeposition is a general term covering various galvanic processes. Electrodeposition of metallic coatings is a process commonly encompassing electroplating and/or electroless plating. A characteristic feature of the electroplating process is that deposition occurs via the reduction of metal ions from an electrolyte. In order to reduce the metal ions from the electrolyte, electrons have to be transferred from an anode to a cathode where the metallic coating is formed. To transfer electrons, a direct current is supplied to the galvanic cell where the anode is coupled to the positive (+) terminal and the cathode is coupled to the negative (−) terminal of an external power supply unit. In case the anode metal is soluble in the electrolyte, at the anode, metal will be oxidized to metal ions that contribute to maintaining the concentration of metal ions in the electrolyte. In the case of insoluble anodes, a species from the electrolyte is oxidized, for example water, where oxygen is released along with protons and electrons. In this latter case, metal ions are depleted from the electrolyte and in order to maintain the concentration of metal ions in the electrolyte, there is a need for supplying metal salt to the electrolyte. At the cathode, metal ions from the electrolyte are reduced to a metal, hereby forming the metallic coating. The electrolyte is basically a water based solution where water-soluble metal salts are dissolved. The electrolyte contains therefore metal ions and dissociated salts ($SO_4^{-2}$, $Cl^-$, etc.), which increases the electrical conductivity of the solution, allowing an electrical current to pass through it. The electrolyte is also connecting the two electrodes, i.e. anode and cathode, to what is commonly known as the galvanic cell.

Some electroplating processes can deposit metal without the use of external (DC) power supplies and soluble or insoluble anodes. Such processes are based on the electroless plating principle. Here the metal ions are reduced from the electrolyte containing a chemical (reducing agent) which can be oxidized. As long as the electrolyte contains metal ions and a suitable reducing agent, the metal can be deposited. It is however required that the redox potential for the oxidation process is less than the redox potential for the reduction process in order for the reaction to occur. This can be expressed as follows:

$$E_{ox} < E_{red}$$

Another electroless plating process is called ion-exchange plating. Here, the metal ions from the electrolyte are deposited by the means of an ion-exchange reaction. This process simply occurs because the metal from a metallic surface is oxidized by ions from the electrolyte, which are then reduced onto the metallic surface. This process is self-limiting, because as the ions are exchanged, the driving force for the process (difference in electrochemical potential) decreases, and in the end the reaction stops. Consequently, the ion-exchange plating process cannot be used for the deposition of thick layers, but only of thin layers, typically below 1 µm.

Electrodeposition of cobalt can be done using a broad variety of electrolytes. For example, the process formulated by Watts, based on sulfate and chloride salts of nickel, can easily be adapted to deposit cobalt, if the nickel salts are replaced with the salts of cobalt. Other acidic electrolytes containing salts of cobalt can also be used for electrodepositing a metallic cobalt layer. These cobalt electrolytes can be based on chloride, sulfate, sulfamate, ammonium sulfate, fluoroborate and mixtures thereof. Examples of such electrolytes are given in Table 1:

TABLE 1

Examples of electrolytes

| Constituent | Sulfate/Chloride | Chloride | Sulfamate | Ammonium sulfate | Fluoroborate |
|---|---|---|---|---|---|
| Composition (g/L) | | | | | |
| Cobalt sulfate, $CoSO_4 \cdot 7H_2O$ | 330-565 | | | | |
| Cobalt chloride, $CoCl_2 \cdot 6H_2O$ | 0-45 | 90-105 | | | |
| Cobalt sulfamate, $Co(SO_3NH_2)_2$ | | | 450 | | |
| Cobalt ammonium sulfate, $Co(NH_2)_2(SO_4)_2 \cdot 6H_2O$ | | | | 175-200 | |
| Cobalt fluoroborate, $Co(BF_4)_2$ | | | | | 115-160 |
| Boric acid | 30-45 | 60 | | 25-30 | 15 |
| Formamide, $HCONH_2$ | | | 30 | | |
| Sodium or potassium chloride | | | | | |
| Total cobalt metal | ~70-130 | ~20-25 | ~105 | ~26-30 | ~30-40 |
| Operating conditions | | | | | |

TABLE 1-continued

Examples of electrolytes

| Constituent | Sulfate/Chloride | Chloride | Sulfamate | Ammonium sulfate | Fluoroborate |
|---|---|---|---|---|---|
| pH | 3-5 | 2.5-3.5 | 3-5 | 5-5.2 | 3.5 |
| Temperature (° C.) | 35-65 | 50-55 | 20-50 | 25 | 50 |
| Current density (A/dm$^2$) | 1-5 | 3-4 | 1-5 | 1-3 | 5-10 |

Another possibility for electrodeposition of cobalt is electroless plating. This process typically offers a better and more even material distribution than electroplated coatings. However, these coatings will exhibit the same features and serve the same purpose as the electroplated coatings regarding forming a metallic cobalt coating on a ferritic steel interconnect material.

The deposition of a thin layer of copper on an existing layer of cobalt can be done very easily by ion exchange plating. Cobalt has a lower standard electrochemical potential (−0.28 V vs. SHE) compared to copper, which is more noble (+0.34 V vs. SHE), where SHE (standard hydrogen electrode) is a redox electrode forming the basis of the thermodynamic scale of oxidation-reduction potentials.

This means that copper will plate out on cobalt directly from the solution without the need of applying external current to the galvanic cell. The total reaction can be explained thermodynamically by the following ion exchange reaction:

$$Co + Cu^{2+} \leftrightarrow Cu + Co^{2+}$$

In Table 2 below, the change in free energy $\Delta G = -RT \ln K$ (where K is the equilibrium constant) is indicated along with $\Delta H$ and $\Delta S$ (the change in enthalpy and the change in entropy, respectively):

TABLE 2

Thermodynamic parameters of the reaction
$Co + Cu^{2+} <-> Cu + Co^{2+}$

| T (° C.) | ΔH (kJ) | ΔS (J/K) | ΔG (kJ) | K | log(K) |
|---|---|---|---|---|---|
| 20.00 | −7.409 | −12.377 | −3.781 | 4.718 | 0.674 |
| 25.00 | −7.531 | −12.789 | −3.718 | 4.482 | 0.651 |
| 30.00 | −7.651 | −13.189 | −3.653 | 4.261 | 0.630 |
| 35.00 | −7.770 | −13.578 | −3.586 | 4.055 | 0.608 |
| 40.00 | −7.889 | −13.959 | −3.517 | 3.862 | 0.587 |
| 45.00 | −8.007 | −14.333 | −3.447 | 3.681 | 0.566 |
| 50.00 | −8.124 | −14.699 | −3.374 | 3.511 | 0.545 |

Since ΔG = ΔH − TΔS is negative, the reaction favours Cu deposition.

Since $\Delta G = \Delta H - T\Delta S$ is negative, the reaction favours Cu deposition.

The amount of copper is self-limiting because the reaction will stop as the copper layer builds up. A layer of 100-200 nm Cu is deposited, which is enough to give the desired properties.

One advantage of this invention is that it is easier than other known methods to apply a thin (self-limiting) copper layer on top of a cobalt coating. The process requires no external use of power supplies, electroplating anodes etc. and can simply be carried out in a standard acid sulphate copper electrolyte. The process is also advantageous compared to alloy electrodeposition, where a complexing agent is needed to co-deposit copper along with cobalt from the same electrolyte. Another advantage of this invention is that it solves a known problem with respect to formation of algae in the rinse positions caused by cobalt ions. Since copper is the last metal to be deposited, the last rinse positions in the electroplating line will be enriched with copper ions which, in contrast to cobalt ions, do not promote the formation of algae. This is of interest in order to minimize the amount of waste water in large scale production.

Using the above described approach, other coatings such as a coating of nickel with a top layer of copper can also be deposited advantageously. An interconnect material comprising Cr and Fe is then first deposited with a strike layer of cobalt or nickel. This can be done using the Woods strike or a sulfamate strike formulation. A second layer of nickel is then electrodeposited from a Watts type or another acidic electrolyte (such as chloride, sulfate, sulfamate, ammonium sulfate, fluoroborate and mixtures thereof). On top of the second layer a third layer of cobalt is then electrodeposited using a strike formulation such as Woods or the sulfamate. This strike coating should provide a minimum thickness of at least 300 nm cobalt. A fourth layer of copper can then easily be deposited on top of this cobalt strike layer by ion exchange plating. Hereby forming a coating comprising nickel and copper.

US 2003/0059335 A1 provides a high temperature material comprising a chromium oxide forming an iron-based alloy containing a) 12-28 wt % chromium, b) 0.01 to 0.4 wt % La, c) 0.2 to 1.0 wt % Mn, d) 0.05 to 0.4 wt % Ti, e) less than 0.2 wt % Si, f) less than 0.2 wt % Al with the property that at temperatures of 700° C. to 950° C. said high temperature material is capable of forming at its surface a $MnCr_2O_4$ spinel phase. According to the authors, the object of the invention is to provide a bi-polar plate for a high temperature fuel cell or for spark plugs. One disadvantage of the above method is that the composition of the formed coating is determined by the composition of the alloy and thus cannot be readily modified. Another disadvantage of the method is that the electrical conductivity of a chromium oxide based coating is very low.

US 2013/0230792 A1 discloses a coated interconnect for a solid oxide fuel cell including substrate comprising iron and chromium and a manganese cobalt oxide spinel coating formed over an air side of the interconnect substrate and a method of making and treating thereof. A disadvantage of that method is that the production of interconnects by powder metallurgy and the production of coatings by plasma spraying is very expensive and time consuming.

US 2008/0299417 A1, owned by the Applicant together with Sandvik AB, discloses a fuel cell component, such as an interconnect for solid oxide fuel cells, consists of a metallic substrate, such as stainless steel, and a coating, which in turn comprises at least one metallic layer and one reactive layer, and a method for producing such a fuel cell component. According to one preferred embodiment, the coating is performed by the usage of PVD technique in a continuous roll-to-roll process, preferably electron beam evaporation which might be reactive of plasma activated if needed. One disadvantage of the above method is the PVD method is very expensive, especially if thick layers of coating need to be deposited. Another disadvantage of the above method is that it is suited for the coating of interconnect sheets, and less suited for the coating of already formed interconnect plates.

A method of producing a protective coating on a $Cr_2O_3$ forming substrate is described in US 2006/0193971 A1. The method consists of applying a mixture of CoO, MnO and CuO onto a surface of the substrate already having a layer of $Cr_2O_3$ and treating the substrate at 500-1000° C., thereby converting the applied oxides to a gas-tight, chromium-free spinel coating on the substrate. A disadvantage with the above method is that in contrast to metallic coatings, the deposited oxide coatings will adhere only weakly to the metallic interconnect and are subject to spallation and delamination, lessening the effectiveness of the coating.

SUMMARY OF THE INVENTION

The present invention concerns a method for coating an interconnect for a solid oxide cell (SOC) stack, said method comprising
providing an interconnect substrate comprising Cr and Fe,
coating the interconnect substrate with a first metallic layer by electrodeposition,
coating the resulting structure with a second layer of metallic cobalt by electrodeposition, and
coating the resulting structure with a layer of metallic copper by ion-exchange plating,
thereby forming a metallic copper-cobalt coating on the interconnect.

According to the present invention, this novel coating for SOC stack interconnects is a metallic coating which comprises electrodeposited cobalt and ion-exchange plated copper.

BRIEF DESCRIPTION OF THE DRAWINGS

The invention is described further in the examples which follow below. The examples refer to the Figures, where.

EXAMPLES

Example 1

Co Deposition by Electroplating

Figure 1:
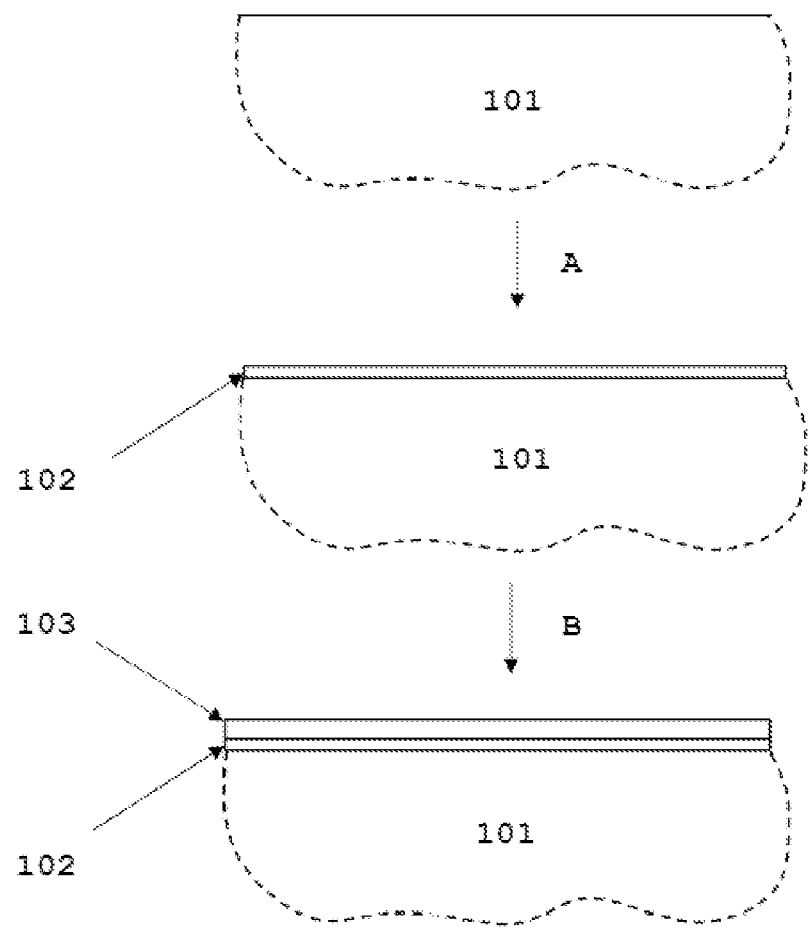
FIG. 1 is a process diagram of the prior art method for cobalt electrodeposition.
Figure 4A:
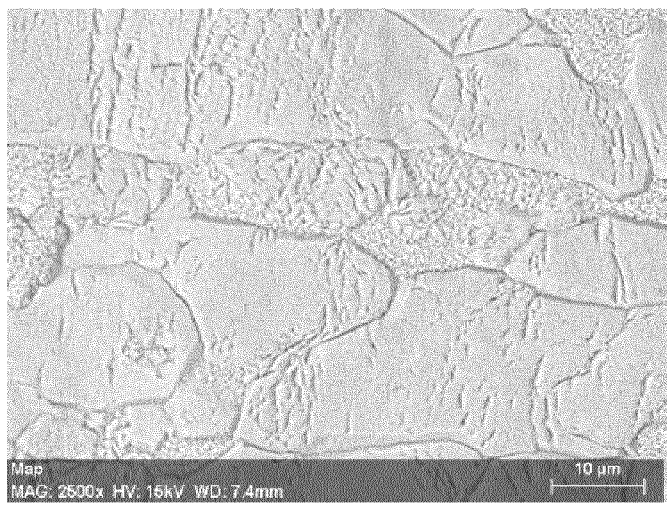
FIGS. 4a and 4b show an energy dispersive X-ray spectroscopy (EDX) analysis of a cobalt coating deposited by electroplating according to the invention.
Figure 4B:
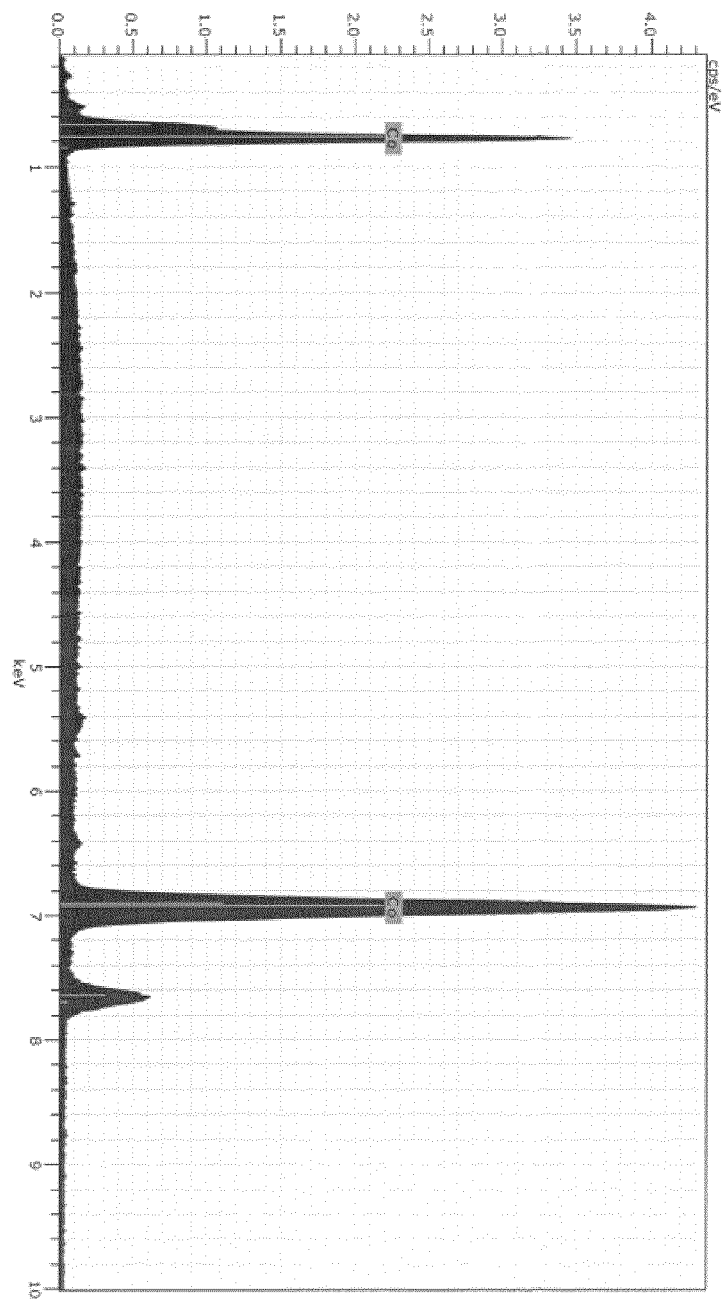

FIG. 1 presents a schematic process diagram of the method for the electrodeposition of cobalt that can be considered prior art. An interconnect substrate comprising Cr and Fe 101 is first covered with a strike layer of nickel or cobalt 102. This step is explained as A in FIG. 1. The electrodeposition of the first metallic layer can be done for example by using the Woods process. Other formulations such as the sulfamate strike can also be used for this purpose. The current densities used in the deposition of the first layer should be in the range of 1-10 A/dm$^2$. The second metallic layer of Co 103 is electrodeposited from a Watts type or another acidic electrolyte (such as chloride, sulfate, sulfamate, ammonium sulfate, fluoroborate and mixtures thereof) with a current density ranging from 0.5 to 5 A/dm$^2$. This step is explained as B in FIG. 1. The thickness of the second metallic Co layer 103 is between 0.5 µm and 10 µm, preferably between 1 µm and 6 µm. EDX (energy dispersive X-ray spectroscopy) analysis reveals that the composition of such a coating is 100% metallic Co as seen in FIGS. 4a and 4b.

Example 2

Figure 2:
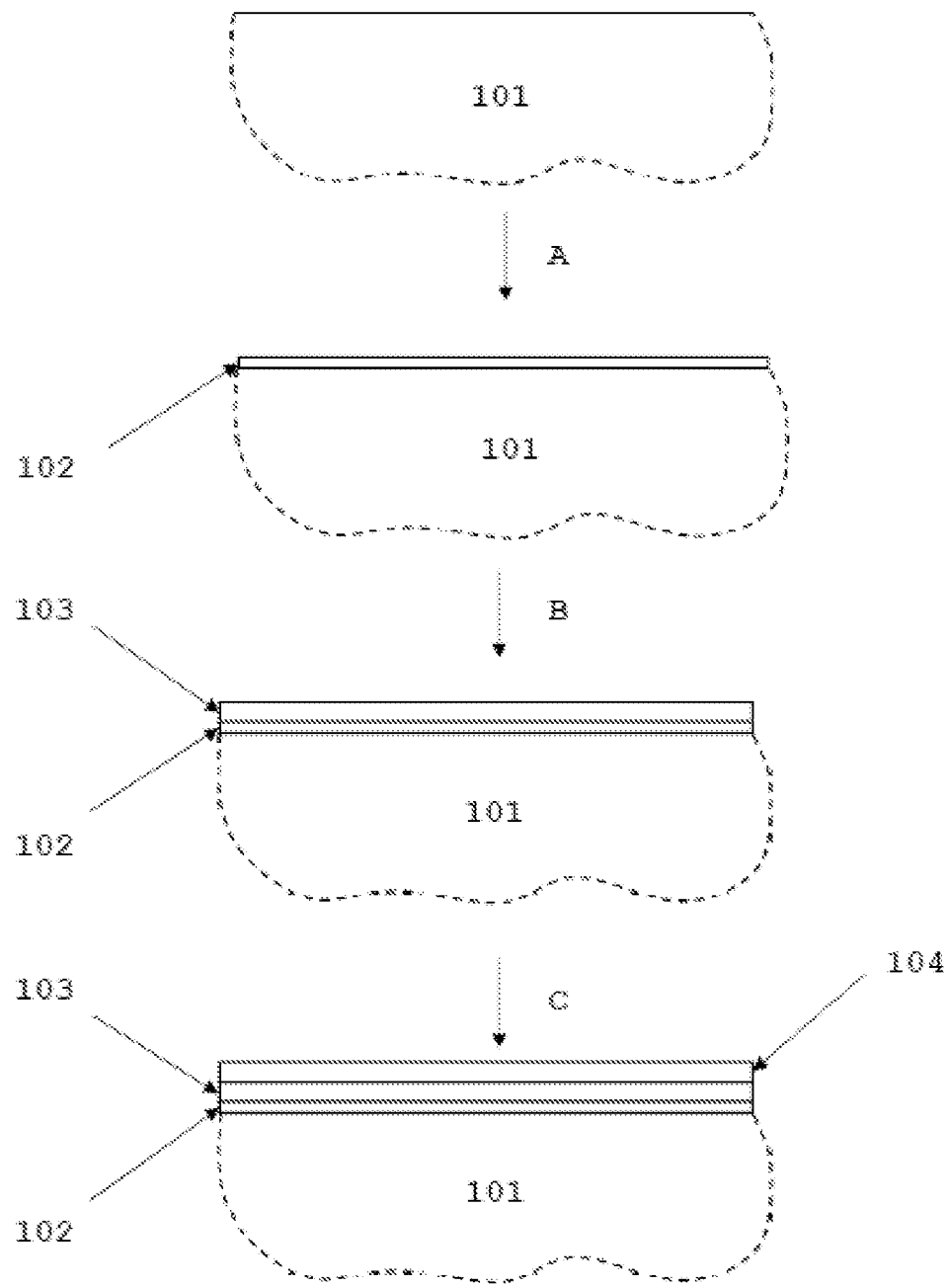
FIG. 2 is a process diagram of the prior art method for cobalt and copper electrodeposition.

Co—Cu deposition by electroplating from alkaline solutions FIG. 2 presents a schematic process diagram of the method for the electrodeposition of cobalt and copper that can be considered prior art. The deposition proceeds according to the method described in Example 1, except that after the electrodeposition of the second metallic Co layer 103, a layer of metallic Cu 104 is deposited by electrodeposition from an alkaline cyanide-based electrolyte solution. This step is explained as C in FIG. 2. The current densities used in the deposition of the Cu layer 104 range from 1 to 6 A/dm$^2$. The growth of the Cu layer from alkaline cyanide-based electrolyte solutions thus requires external electric field to be applied to the galvanic cell and is not self-limiting in nature.

Example 3

Figure 3:
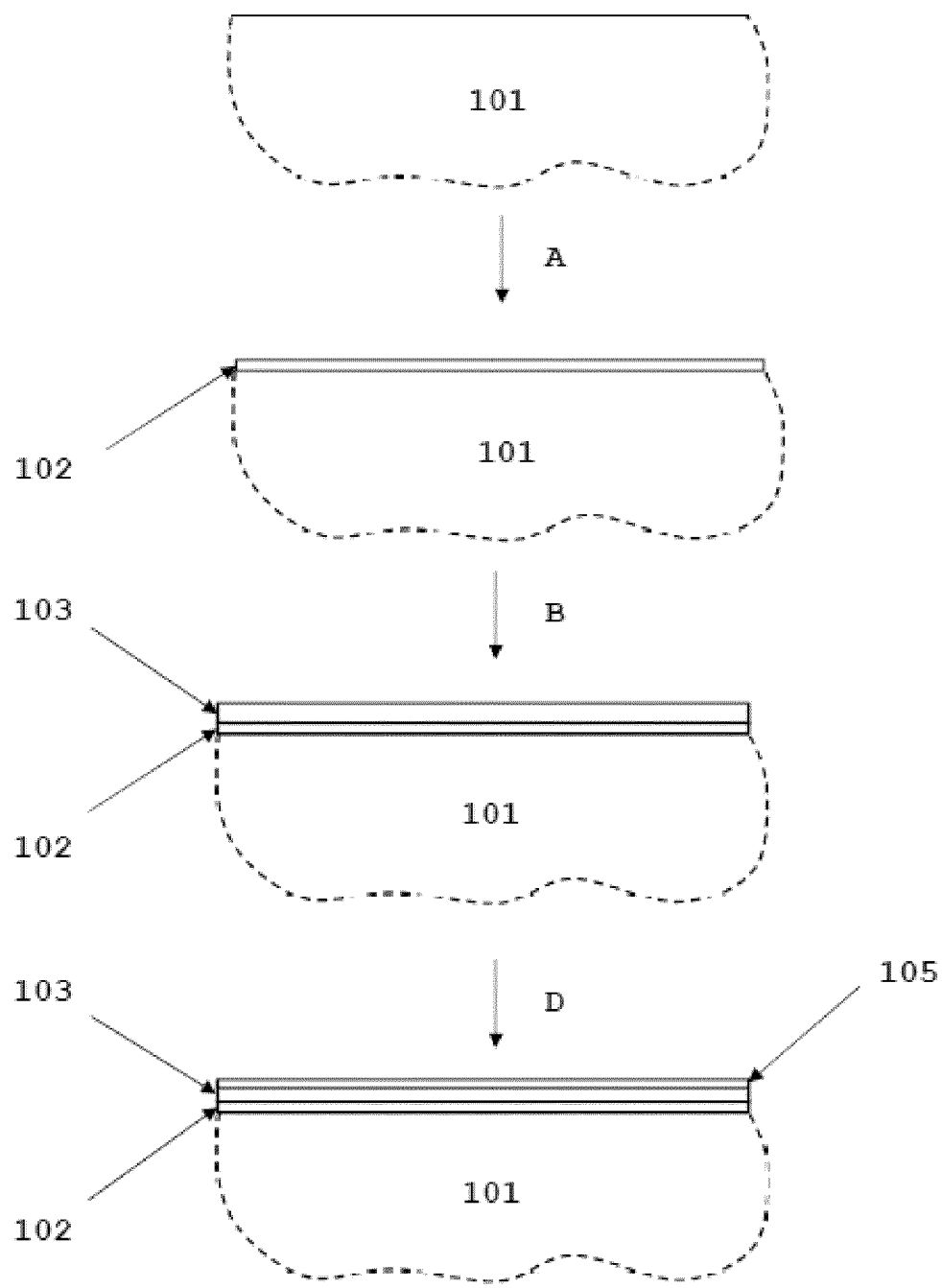
FIG. 3 is a process diagram of electrodeposition and ion-exchange plating of copper according to the present invention.

FIG. 3 presents a schematic process diagram of the present invention for electrodeposition of cobalt and ion-exchange plating of copper. An interconnect substrate comprising Cr and Fe 101 is first covered with a strike layer of nickel or cobalt 102. This step is explained as A in FIG. 3. The electrodeposition of the first metallic layer can be done for example by using the Woods process or a sulfamate strike. The current densities used in the deposition of the first layer should be in the range of 1-10 A/dm$^2$. The second metallic layer of Co 103 is electrodeposited from an acidic electrolyte (such as chloride, sulfate, sulfamate, ammonium sulfate, fluoroborate and mixtures thereof) with a current density ranging from 0.5 to 5 A/dm$^2$. This step is explained as B in FIG. 3. The thickness of the second metallic Co layer 103 is between 0.5 µm and 10 µm, preferably between 1 µm and 6 µm. A third metallic layer of Cu 105 is then deposited onto resulting structure by ion-exchange plating from an acidic solution comprising copper ions. This step is explained as D in FIG. 3. One example of an acidic solution of copper ions is the acid sulfate copper electrolyte, comprising 160-230 g/liter $CuSO_4.5H_2O$ and 40-100 g/liter $H_2SO_4$, optionally with minor addition of sodium chloride in the range of 30-150 mg/liter. However, the ion exchange reaction will also occur from other types of electrolytes containing $Cu^{2+}$ ions in an acidic pH. The ion exchange reaction between copper and cobalt will occur as long as the pH of the solution is low enough to remove the passive cobalt oxide layer on the surface which will initiate the ion exchange reaction. The growth of the Cu layer from acidic electrolyte solutions does not require an external electric field to be applied during deposition. Furthermore, the growth of Cu is self-limiting in nature, resulting in a layer with a thickness of approximately 100 nm to 200 nm. X-ray fluorescence (XRF) measurements of the copper layer as deposited are shown in Table 3 below. In the table, POM is point of measurement and Row is the number of the measured point.

TABLE 3

| XRF measurements of deposited copper layers | | | |
|---|---|---|---|
| POM1: µm Cu | | POM2: µm Co | |
| Row | Mean | Row | Mean |
| 1 | 0.1 | 1 | 5.0 |
| 2 | 0.2 | 2 | 3.0 |
| 3 | 0.2 | 3 | 2.0 |

TABLE 3-continued

XRF measurements of deposited copper layers

| POM1: µm Cu | | POM2: µm Co | |
|---|---|---|---|
| Row | Mean | Row | Mean |
| 4 | 0.2 | 4 | 2.0 |
| 5 | 0.2 | 5 | 2.1 |
| 6 | 0.1 | 6 | 3.0 |
| 7 | 0.1 | 7 | 4.8 |
| 8 | 0.1 | 8 | 4.8 |
| 9 | 0.1 | 9 | 1.9 |
| 10 | 0.1 | 10 | 1.8 |
| 11 | 0.2 | 11 | 3.1 |
| 12 | 0.1 | 12 | 5.0 |

The analysis of the final coated interconnect reveals that the top layer comprises Cu. As a result of the ion-exchange plating of Cu, the surface of the interconnect changes colour from white greyish to the characteristic bronze-brown colour of copper metal.

The invention claimed is:

1. A method for coating an interconnect for a solid oxide cell (SOC) stack, said method comprising:
providing an interconnect substrate comprising Cr and Fe,
coating the interconnect substrate with a first metallic layer by electrodeposition,
coating a second layer of metallic cobalt over the first metallic layer by electrodeposition, and
coating a layer of metallic copper over the second layer of metallic cobalt by ion-exchange plating, thereby forming a metallic copper-cobalt coating on the interconnect.

2. The method according to claim 1, wherein the electrodeposition of the first metallic layer and the second metallic Co layer comprises electroplating.

3. The method according to claim 1, wherein the first metallic layer is either cobalt or nickel.

4. The method according to claim 1, wherein the thickness of the first metallic layer is between 10 and 2000 nm.

5. The method according to claim 1, wherein the thickness of the second metallic Co layer is between 0.5 and 10 µm.

6. The method according to claim 1, wherein a different electrolyte is used for the electrodeposition of the first metallic layer and for the electrodeposition of the second metallic Co layer.

7. The method according to claim 1, wherein the ion-exchange plating is carried out in an acidic copper electrolyte.

8. The method according to claim 7, wherein the acidic copper electrolyte comprises 160-230 g/liter $CuSO_4.5H_2O$, 40-100 g/liter $H_2SO_4$, optionally with minor addition of sodium chloride in the range of 30-150 mg/liter.

9. The method according to claim 1, where the ion-exchange plating is self-limiting.

10. The method according to claim 9, where the thickness of the metallic copper layer coated over the second layer of metallic cobalt is between 10 and 1000 nm.

* * * * *